Sept. 8, 1925.
C. GIRL
AUTOMOBILE BUMPER
Filed Dec. 24, 1923
1,553,232
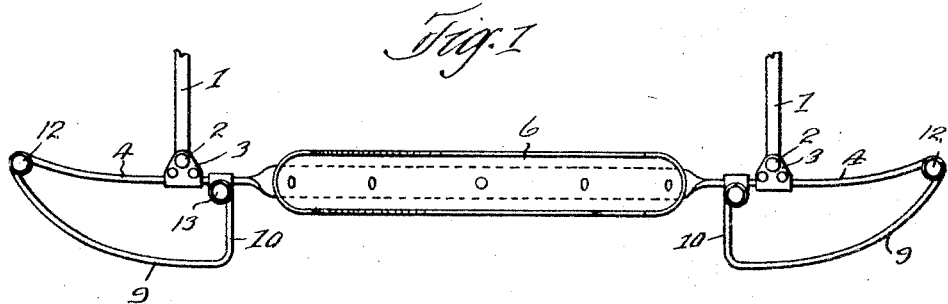
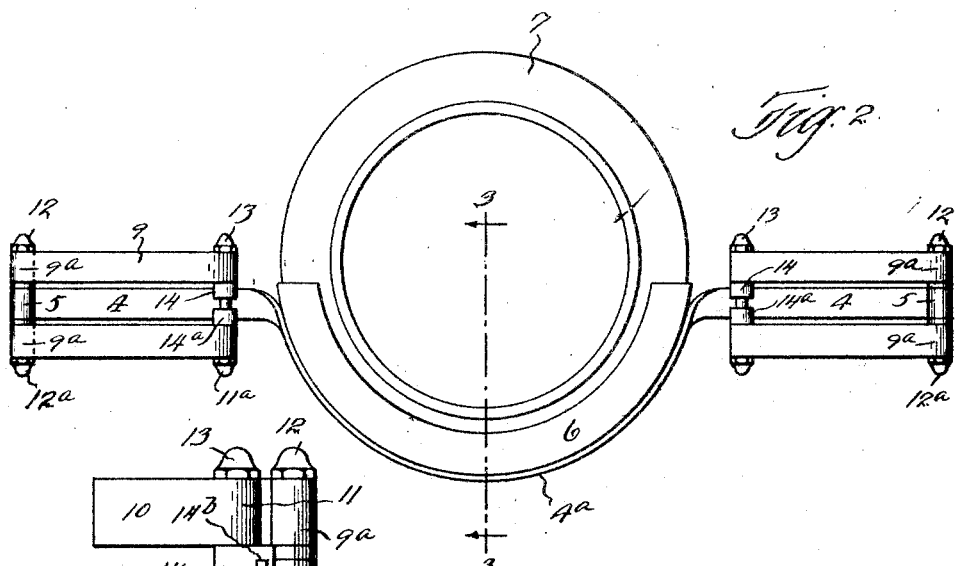
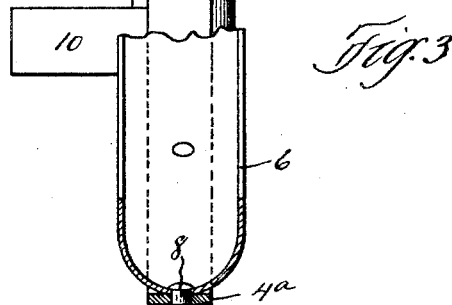
Inventor
Christian Girl
By Hull, Brock & West
Attys Patented Sept. 8, 1925.

1,553,232

UNITED STATES PATENT OFFICE.

CHRISTIAN GIRL, OF DETROIT, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed December 24, 1923. Serial No. 682,505.

*To all whom it may concern:*

Be it known that I, CHRISTIAN GIRL, a citizen of the United States, residing at Detroit, in the county of Wayne and State of Michigan, have invented a certain new and useful Improvement in Automobile Bumpers, of which the following is a full, clear, and exact description, reference being had to the accompanying drawings.

This invention relates to bumpers for automobiles or similar vehicles and more particularly to bumpers for the rear of such vehicles.

It is the general object of the invention to provide a combined bumper and tire carrier which will protect the fenders in a particularly efficient manner and will at the same time be capable of efficiently supporting a spare tire. Further and more limited objects of the invention will appear hereinafter and will be realized in and through the combinations of elements embodied in the claims.

In the drawings forming part hereof, Fig. 1 represents a plan view and Fig. 2 a rear elevation of a bumper constructed in accordance with my invention; and Fig. 3 a sectional detail corresponding to the line 3—3 of Fig. 1, the clamp 3 being omitted.

Describing the various parts by reference characters, 1 denotes a pair of supporting arms, each adapted to be secured to the side member of an automobile or like vehicle and each having pivotally connected at its rear end, by means of a pivot bolt 2, a clamp 3, which clamp is secured to the front, or forwardly-presented, bar of a bumper. This bar comprises a pair of end portions 4 each having an eye 5 at the end thereof. The central portion of the bar 4 is turned or twisted at about 90° and bent downwardly, as shown at 4ª, to form a short fore-and-aft cylindrical seat for a tire carrier 6. This tire carrier is shown as an ordinary segmental channel which is adapted to receive a spare tire 7, and is riveted or otherwise suitably secured to the part 4ª of the bumper, as indicated at 8.

Each end section of the bumper comprises one of the parts 4 and a pair of rearwardly curved plates or bars 9, each having an eye 9ª at its outer end and each having an inwardly directed portion 10 provided with an eye 11. The eyes 9ª at the outer end of each pair of bars 9 are adapted to receive therebetween an eye 5 of the bar 4, and the parts are secured together by means of a bolt 12 extending through such eyes and having at its lower end a nut 12ª. The eyes 11 are secured to the bar 4 adjacent thereto by means of a bolt 13, extending through such eyes and through a pair of symmetrical clamping members 14, 14ª, adapted to bear against the lower edge of the upper bar portion 10 and the upper edge of the lower bar portion 10, respectively, and each having a recess 14ᵇ, adapted respectively to engage the upper and the lower edge of the bar 4.

By the construction shown and described herein, an extremely efficient and inexpensive bumper and tire carrier is provided and one wherein the front bar 4, 4ª, serves not only to connect the fender guard portions of the bumper, thereby stiffening the same, but also to support the tire carrier.

Having thus described my invention, what I claim is:—

1. A bumper comprising a pair of end sections each adapted to overhang and protect a fender and an intermediate section connecting such end sections, and a tire carrier secured to such intermediate section.

2. A bumper comprising a pair of end sections each adapted to overhang and protect a fender, and an intermediate section connecting said end sections and being downwardly bowed between the said end sections to provide a support for and conforming in curvature to a tire carrier.

3. A bumper comprising a pair of rearwardly projecting end sections each adapted to overhang and protect a fender and a bar at the front of and connecting the said sections, the said bar being bent downwardly between said sections, and a channeled tire carrier mounted on top of such intermediate portion of said bar.

4. A bumper comprising a pair of rearwardly projecting end sections each adapted to overhang and protect a fender and a bar at the front of and connecting the said sections, the said bar being bent downwardly between said sections, and a tire carrier secured to such intermediate portion of said bar.

5. A bumper comprising a bar adapted to extend across the rear of an automobile and to overhang at its ends and protect the fenders thereof, said bar having its intermediate portion bent downwardly to form a seat for a tire carrier, and a tire carrier mounted on said seat.

6. A bumper comprising a bar adapted to extend across the rear of an automobile and to overhang the fenders thereof with its ends, the intermediate portion of said bar being bent downwardly to form a seat for a segmental channeled tire carrier, and a pair of rearwardly projecting bars cooperating with each end portion of the first mentioned bar, the last mentioned bars having their ends connected to the corresponding ends of the first mentioned bar and above and below the same and having their inner ends bent forwardly and connected to the first mentioned bar, above and below the latter, the first mentioned bar being bent downwardly and given a quarter turn adjacent its points of connection with the second mentioned bars, thereby to provide a flat seat for a tire carrier.

7. A bumper comprising a bar adapted to extend across the rear of an automobile and to overhang at its ends and protect the fenders thereof, said bar having its intermediate portion given a quarter turn and bent downwardly to form a flat seat for a tire carrier.

In testimony whereof, I hereunto affix my signature.

CHRISTIAN GIRL.